Patented Aug. 4, 1925.

1,548,616

UNITED STATES PATENT OFFICE.

PAUL W. KRUGER, OF BOYETT, MISSISSIPPI.

PROCESS OF RETARDING DETERIORATION OF DENTAL CEMENTS.

No Drawing. Application filed October 8, 1923. Serial No. 667,414.

*To all whom it may concern:*

Be it known that I, PAUL W. KRUGER, a citizen of the United States, residing at Boyett, county of Attala, and State of Mississippi, have invented a new and useful Process of Retarding Deterioration of Dental Cements, of which the following is a specification.

In this specification, the word "retarding" as it applies herein is defined as meaning retarding, hindering or delaying, partially or wholly, deterioration in setting activity of dental cements.

My invention relates to a process of retarding deterioration in setting activity and deterioration in setting quality of dental cements that comprise a cement powder and a setting liquid required to set with the cement powder to form a hardened mass by chemically reacting with the cement powder. It relates to a process of retarding deterioration in rapidity of setting and deterioration in quality of setting of dental cements, that results through age or exposure to air and moisture, and relates to such dental cements that are in a form that embraces a solid portion or powder in its manufacture and a setting liquid required to set with the powder to form a hardened mass by chemical reaction.

My invention has for its object the retarding of deterioration in the setting rapidity and setting quality of such dental cements comprising a cement powder and a setting liquid required to set with the powder to form a hardened mass by chemical reaction.

The powders of dental cements that comprise or contain magnesium cement powders particularly, and also other dental cements comprising or containing powders which are affected by air or become hydrated through atmospheric moisture in general such as those that contain silicates, calcium, and zinc oxide, lose their rapidity of setting with their respective setting liquids, through age and exposure to air and moisture of atmosphere. In magnesium oxychloride cements particularly and such dental cement powders as contain magnesium oxychloride, and dental cements comprising a cement powder comprising or containing an oxide made from the magnesium nitrate, there is rapid deterioration partly on account of the deliquescent property and through exposure to air even momentarily from time to time as exposed to air in use. Such cements then for commercial uses in dentistry where a cement should be quick setting and reliable, are of diminished value because of the deterioration that takes place in the cement solid portion as provided in powder form.

In experimenting to devise a means of retarding deterioration in dental cements in a form that embraces a solid portion or powder and a setting liquid required to set with the powder to form a hardened mass by chemical reaction, I found that the deterioration in setting rapidity with the appropriate cement setting liquid, and deterioration in setting quality may be greatly retarded conveniently by a process which consists in coating the cement powder or solid portion with protective substances protecting from air and moisture and subsequently dispelling the protective substances by evaporation or combustion or by equivalent physical means.

The protective substances I use are such as are readily evaporated by heat or driven off by combustion with a negligible residue of any carbon or deposit. Of the solid substances I prefer to use pyroxylin deposited on the powder to coat the powder, which is readily accomplished by using pyroxylin in any of its appropriate solvents such as amyl alcohol or combinations of petroleum ether with acetone or with amyl alcohol, allowing the solvents to evaporate leaving the powder in a form of crumples or in sheets or in convenient, moulded forms depending upon the form desired and upon the amount of pyroxylin used. Instead of protective solids I can also use protective liquids being a matter of choice or convenience to produce a form convenient to meet the dental requirements of use in small quantities. Of the effective, suitable liquids I prefer to use such as are readily volatilized and that do not chemically unite or appreciably unite to any considerable extent with the dental cement powder or solid portion. The volatile liquids I use are acetone, benzine, amyl alcohol or other liquid leaving little carbon deposit when driven off by heat if the same ignite.

The powder of a dental cement so protected from the action of the air and moisture of the air, is prepared for use by dispelling the protective substance or is subjected to heat as the cement is needed in small quantities for dental uses from time to time when the protective coating of fluid or solid is quickly dispelled by evaporation or combustion as required.

I claim:

1. The process of retarding deterioration of dental cements that comprise a cement solid portion and a setting liquid portion required to set with the solid portion to form a hardened mass by chemical reaction, consisting in incorporating with the said solid portion a substance protective against air and moisture and for use dispelling the protective substance by physical means.

2. The process of retarding deterioration of dental cements that comprise a cement powder and a setting liquid required to set with the cement powder to form a hardened mass by chemical reaction, consisting in incorporating with the said powder a substance protective against air and moisture and for use subjecting the said powder so protected, to heat.

3. The process of retarding deterioration of dental cements that comprise a cement powder and a setting liquid required to set with the cement powder to form a hardened mass by chemical reaction, consisting in incorporating a volatile substance with the said powder and for use dispelling the volatile substance.

4. The process of retarding deterioration of dental cements that comprise a powder comprising or containing a magnesium cement powder, and a setting liquid required to set with the said powder to form a hardened mass by chemical reaction, consisting in incorporating with the said powder a substance protective against air and moisture and for use subjecting the said powder so protected, to heat.

5. The process of retarding deterioration of dental cements that comprise a powder which comprises or contains a magnesium oxychloride, and a setting liquid required to set with the said powder to form a hardened mass by chemical reaction, consisting in incorporating a suitable protective combustible substance that ignites without detrimental residue, with the said powder and for use subjecting the said powder and combustible substance to heat to dispel the said combustible substance.

6. The process of retarding deterioration of dental cements that comprise a powder comprising or containing a magnesium oxychloride, and a setting liquid required to set with the said powder to form a hardened mass by chemical reaction, consisting in incorporating amyl alcohol with the said powder and for use subjecting the said powder and amyl alcohol to heat which dispels the amyl alcohol.

This specification signed this first day of October, 1923.

PAUL W. KRUGER.